US010083053B2

(12) United States Patent
Dong

(10) Patent No.: US 10,083,053 B2
(45) Date of Patent: Sep. 25, 2018

(54) SYSTEM AND METHOD FOR VIRTUAL MACHINE LIVE MIGRATION

(71) Applicant: Huawei Technologies Co., Ltd., Shenzhen (CN)

(72) Inventor: Yijian Dong, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 509 days.

(21) Appl. No.: 14/531,405

(22) Filed: Nov. 3, 2014

(65) Prior Publication Data
US 2015/0052282 A1 Feb. 19, 2015

Related U.S. Application Data

(63) Continuation of application No. PCT/CN2012/080703, filed on Aug. 29, 2012.

(51) Int. Cl.
*G06F 9/455* (2018.01)
*H04L 12/931* (2013.01)
(Continued)

(52) U.S. Cl.
CPC .......... *G06F 9/45558* (2013.01); *G06F 13/32* (2013.01); *G06F 13/4022* (2013.01);
(Continued)

(58) Field of Classification Search
CPC .. G06F 13/32; G06F 13/4022; G06F 9/45558; G06F 2009/4557; G06F 2213/4004; H04L 49/70
(Continued)

(56) References Cited

U.S. PATENT DOCUMENTS 9,450,885 B2 * 9/2016 Johnsen .............. G06F 9/45533
2007/0186025 A1 * 8/2007 Boyd .................... G06F 9/5077
710/305

(Continued)

FOREIGN PATENT DOCUMENTS

CN 102118458 A 7/2011

OTHER PUBLICATIONS

Kadav, A., et al., "Live Migration of Direct-Access Devices," ACM SIGOPS Operating Systems Review, vol. 43, No. 3, Jul. 2009, 7 pages.
(Continued)

*Primary Examiner* — Meng Ai T An
*Assistant Examiner* — Willy W Huaracha
(74) *Attorney, Agent, or Firm* — Conley Rose, P.C.

(57) ABSTRACT

A system for virtual machine live migration includes a management node, a source server, a destination server, a peripheral component interconnect express (PCIe) switch, and an single root input/output virtualization (SR-IOV) network adapter, where the source server includes a virtual machine (VM) before live migration; the destination server includes a VM after live migration; the management node is adapted to configure, using the PCIe switch, a connection relationship between a virtual function (VF) module used by the VM before live migration and the source server as a connection relationship between the VF module and the destination server; and the destination server, using the PCIe switch and according to the connection relationship with the VF module configured by the management node, uses the VF module to complete virtual machine live migration. By switching the connection relationships, the system ensures that a data packet receiving and sending service is not uninterrupted.

10 Claims, 5 Drawing Sheets

(51) Int. Cl.
*G06F 13/32* (2006.01)
*G06F 13/40* (2006.01)

(52) U.S. Cl.
CPC ...... *H04L 49/70* (2013.01); *G06F 2009/4557* (2013.01); *G06F 2213/4004* (2013.01)

(58) Field of Classification Search
USPC .......................................................... 718/1
See application file for complete search history.

(56) References Cited

U.S. PATENT DOCUMENTS

| | | | | |
|---|---|---|---|---|
| 2008/0147887 | A1* | 6/2008 | Freimuth | G06F 13/4022 710/1 |
| 2009/0313391 | A1 | 12/2009 | Watanabe | |
| 2010/0082874 | A1* | 4/2010 | Baba | G06F 3/0227 710/316 |
| 2010/0153514 | A1 | 6/2010 | Dabagh et al. | |
| 2011/0179414 | A1 | 7/2011 | Goggin et al. | |
| 2012/0042034 | A1* | 2/2012 | Goggin | G06F 9/4856 709/216 |
| 2012/0096192 | A1* | 4/2012 | Tanaka | G06F 13/385 710/20 |
| 2012/0137292 | A1* | 5/2012 | Iwamatsu | G06F 9/45558 718/1 |
| 2012/0254862 | A1* | 10/2012 | Dong | G06F 9/4856 718/1 |
| 2013/0254321 | A1* | 9/2013 | Johnsen | G06F 9/45533 709/212 |
| 2015/0052281 | A1* | 2/2015 | Hart | G06F 13/16 710/308 |

OTHER PUBLICATIONS

Foreign Communication From a Counterpart Application, PCT Application No. PCT/CN2012/080703, English Translation of International Search Report dated Jun. 6, 2013, 3 pages.
Foreign Communication From a Counterpart Application, PCT Application No. PCT/CN2012/080703, Written Opinion dated Jun. 6, 2013, 5 pages.
Foreign Communication From a Counterpart Application, European Application No. 12883617.8, Extended European Search Report dated May 4, 2015, 7 pages.

* cited by examiner

SYSTEM AND METHOD FOR VIRTUAL MACHINE LIVE MIGRATION

CROSS-REFERENCE TO RELATED APPLICATIONS

This application is a continuation of International Application No. PCT/CN2012/080703, filed on Aug. 29, 2012, which is hereby incorporated by reference in its entirety.

TECHNICAL FIELD

The present invention relates to the server field, and in particular, to a system and a method for virtual machine (VM) live migration.

BACKGROUND

A server virtualization technology is a current hotspot, and a virtual machine "live migration" technology is a hotspot in a virtualization technology. The virtual machine live migration technology is mainly applied in scenarios such as maintenance of server load balancing or virtual machine disaster recovery and backup.

The virtual machine live migration technology refers to that an operating status of an entire virtual machine is completely saved, and at the same time, the virtual machine can be quickly resumed on another physical server. In an ideal situation, after being resumed, the virtual machine still operates smoothly, and a user does not perceive any difference.

In the prior art, multiple application solutions to virtual machine live migration exist according to system differences. However, during a virtual machine live migration process, a received data packet and/or a sent data packet is frequently lost, which cannot ensure continuity of network communication.

SUMMARY

In view of this, embodiments of the present invention provide a system and a method for virtual machine live migration to ensure continuity of network communication during a virtual machine live migration process.

According to a first aspect, a system for VM live migration is provided, and includes a management node, a source server, a destination server, a peripheral component interconnect express (PCIe) switch, and a single root input/output virtualization (SR-IOV) network adapter, where the source server, the destination server, the management node, and the SR-IOV network adapter separately connect to a physical port of the PCIe switch to perform communication; the source server includes a virtual machine before live migration, and the virtual machine before live migration is a source end of virtual machine live migration; the SR-IOV network adapter includes a physical input/output port and a virtual function (VF) module, where the physical input/output (I/O) port is configured to connect to one physical port of the PCIe switch to perform communication; the management node is adapted to configure, using the PCIe switch, a connection relationship between the VF module used by the virtual machine before live migration and the source server as a connection relationship between the VF module and the destination server; the destination server includes a virtual machine after live migration, and the virtual machine after live migration is a destination end of the virtual machine live migration; and a virtual machine monitor of the destination server is configured to, using the PCIe switch and according to the connection relationship with the VF module configured by the management node, use the VF module to complete the virtual machine live migration.

In a first possible implementation manner, the connection relationship between the VF module and the source server is a connection relationship between the VF module and the source server using one physical port of the PCIe switch, and the connection relationship between the VF module and the destination server is a connection relationship between the VF module and the destination server using one physical port of the PCIe switch.

In a second possible implementation manner or with reference to the first possible implementation manner of the first aspect, in a third possible implementation manner, the management node is further configured to initiate a migration request to the virtual machine monitor of the source server, and after the connection relationship between the VF module and the source server is configured as the connection relationship between the VF module and the destination server, notify the virtual machine monitor of the destination server; then, the virtual machine monitor (VMM) of the source server is further configured to suspend the virtual machine before live migration according to the migration request, acquire data of the virtual machine before live migration and configuration information of the VF module, and send them to the virtual machine monitor of the destination server; and that the virtual machine monitor of the destination server is configured to use the VF module according to the connection relationship with the VF module configured by the management node is as follows. The virtual machine monitor of the destination server is configured to receive a notification from the management node, configure the VF module for the virtual machine after live migration, and configure the VF module according to the data of the virtual machine before live migration and the configuration information of the VF module that are received from the virtual machine monitor of the source server, so that the virtual machine after live migration uses the VF module to resume operating on the destination server.

With reference to the third possible implementation manner of the first aspect, in a fourth possible implementation manner, that the management node configures the connection relationship between the VF module and the source server as the connection relationship between the VF module and the destination server includes configuring a mapping between one physical port of the PCIE switch and an address of hardware of the source server as a mapping between the physical port of the PCIE switch and an address of hardware of the destination server, where the physical port is used by the VF module.

With reference to the third possible implementation manner or the fourth possible implementation manner of the first aspect, in a fifth possible implementation manner, that the virtual machine monitor of the destination server configures the VF module for the virtual machine after live migration includes changing address mapping information of hardware of an input/output memory management unit (IOMMU) of the destination server, so that the VF module accesses the virtual machine after live migration according to the address mapping information.

With reference to any one of the third to the fifth possible implementation manners of the first aspect, in a sixth possible implementation manner, the virtual machine monitor of the source server is further configured to, before the management node configures the connection relationship between the VF module and the source server as the connection relationship between the VF module and the destination server, if a to-be-sent data packet still exists on the virtual machine before live migration, send the to-be-sent data packet to the virtual machine monitor of the destination server; and the virtual machine after live migration is further configured to, after operating is resumed on the destination server, send, using the VF module, the to-be-sent data packet that is received by the virtual machine monitor of the destination server.

With reference to any one of the third to the sixth possible implementation manners of the first aspect, in a seventh possible implementation manner, the VF module is configured to, after the management node configures the connection relationship between the VF module and the source server as the connection relationship between the VF module and the destination server, if a to-be-received data packet still exists on the virtual machine before live migration, perform direct memory access (DMA), send the to-be-received data packet to the virtual machine monitor of the destination server, and initiate an interruption request to the virtual machine after live migration, so that the virtual machine monitor of the destination server receives and records the interruption request; the virtual machine monitor of the destination server is further configured to, after the virtual machine after live migration resumes operating on the destination server, send the recorded interruption request to the virtual machine after live migration; and the virtual machine after live migration is further configured to process the to-be-received data packet that is received by the virtual machine monitor of the destination server.

According to a second aspect, a method for VM live migration is provided, and includes configuring, by a management node using a PCIe switch, a connection relationship between a VF module and a source server as a connection relationship between the VF module and a destination server, so that a virtual machine monitor of the destination server uses the VF module according to the connection relationship with the VF module configured by the management node, to complete virtual machine live migration, where the VF module is a VF module on an SR-IOV network adapter used by a virtual machine before live migration; and the source server, the destination server, the management node, and the SR-IOV network adapter separately connect to a physical port of the PCIe switch to perform communication; the source server is a server on which the virtual machine before live migration is located, and the virtual machine before live migration is a source end of the virtual machine live migration; the destination server is a server on which a virtual machine after live migration is located, and the virtual machine after live migration is a destination end of the virtual machine live migration; and the SR-IOV network adapter includes a physical input/output port and the VF module, where the physical input/output port is configured to connect to one physical port of the PCIe switch to perform communication.

In a first possible implementation manner, the connection relationship between the VF module and the source server is a connection relationship between the VF module and the source server using one physical port of the PCIe switch, and the connection relationship between the VF module and the destination server is a connection relationship between the VF module and the destination server using one physical port of the PCIe switch.

In a second possible implementation manner or with reference to the first possible implementation manner of the second aspect, in a third possible implementation manner, the management node initiates a migration request to the virtual machine monitor of the source server; the VMM of the source server suspends the virtual machine before live migration according to the migration request, acquires data of the virtual machine before live migration and configuration information of the VF module, and sends them to the virtual machine monitor of the destination server; after configuring the connection relationship between the VF module and the source server as the connection relationship between the VF module and the destination server, the management node notifies the virtual machine monitor of the destination server; the virtual machine monitor of the destination server receives a notification from the management node, configures the VF module for the virtual machine after live migration, and configures the VF module according to the data of the virtual machine before live migration and the configuration information of the VF module that are received from the virtual machine monitor of the source server; and the virtual machine after live migration uses the VF module to resume operating on the destination server.

With reference to the third possible implementation manner of the second aspect, in a fourth possible implementation manner, that the management node configures the connection relationship between the VF module and the source server as the connection relationship between the VF module and the destination server includes the following. The management node configures a mapping between one physical port of the PCIe switch and an address of hardware of the source server as a mapping between the physical port of the PCIe switch and an address of hardware of the destination server, where the physical port is used by the VF module.

With reference to the third possible implementation manner or the fourth possible implementation manner of the second aspect, in a fifth possible implementation manner, that the virtual machine monitor of the destination server configures the VF module for the virtual machine after live migration includes changing address mapping information of hardware of an IOMMU of the destination server, so that the VF module accesses the virtual machine after live migration according to the address mapping information.

With reference to any one of the third to the fifth possible implementation manners of the second aspect, in a sixth possible implementation manner, before the management node configures the connection relationship between the VF module and the source server as the connection relationship between the VF module and the destination server, if a to-be-sent data packet still exists on the virtual machine before live migration, the virtual machine monitor of the source server sends the to-be-sent data packet to the virtual machine monitor of the destination server; and after resuming operating on the destination server, the virtual machine after live migration sends, using the VF module, the to-be-sent data packet that is received by the virtual machine monitor of the destination server.

With reference to any one of the third to the sixth possible implementation manners of the second aspect, in a seventh possible implementation manner, after the management node configures the connection relationship between the VF module and the source server as the connection relationship between the VF module and the destination server, if a to-be-received data packet still exists on the virtual machine before live migration, the VF module further performs DMA, sends the to-be-received data packet to the virtual machine monitor of the destination server, and initiates an interruption request to the virtual machine after live migration, so that the virtual machine monitor of the destination server receives and records the interruption request; and after the virtual machine after live migration resumes operating on the destination server, the virtual machine monitor of the destination server further sends the recorded interruption request to the virtual machine after live migration, and the virtual machine after live migration processes the to-be-received data packet that is received by the virtual machine monitor of the destination server.

With the foregoing technical solutions and during a virtual machine live migration process, a PCIe switch may be used to switch a connection relationship of a VF module on an SR-IOV network adapter, to keep the VF module of the SR-IOV network adapter connected to a virtual machine before live migration and a virtual machine after live migration unchanged, thereby ensuring that a data packet receiving and sending service is uninterrupted and ensuring continuity of a network service.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

The term "and/or" in this document is only an associative relationship for describing associated objects and represents that three relationships may exist. For example, A and/or B may represent that A independently exists, both A and B exist, and B independently exists. In addition, a character "/" in this specification generally represents that former and later associated objects are in an "or" relationship.

Virtual machine live migration mainly includes the following technical points: external storage device migration, memory status migration, and network device migration.

Currently, a common method for external storage device migration includes sharing, using a network, an external storage device, for example, a centrally shared external device such as a Storage Area Network (SAN) or a Network-Attached Storage (NAS).

Currently, a common method for memory status migration includes a memory pre-copy technology and so on.

Currently, a common method for network device migration is mostly applied to migration of a virtual network device, where the virtual network device is also referred to as a virtual network adapter.

Figure 1:
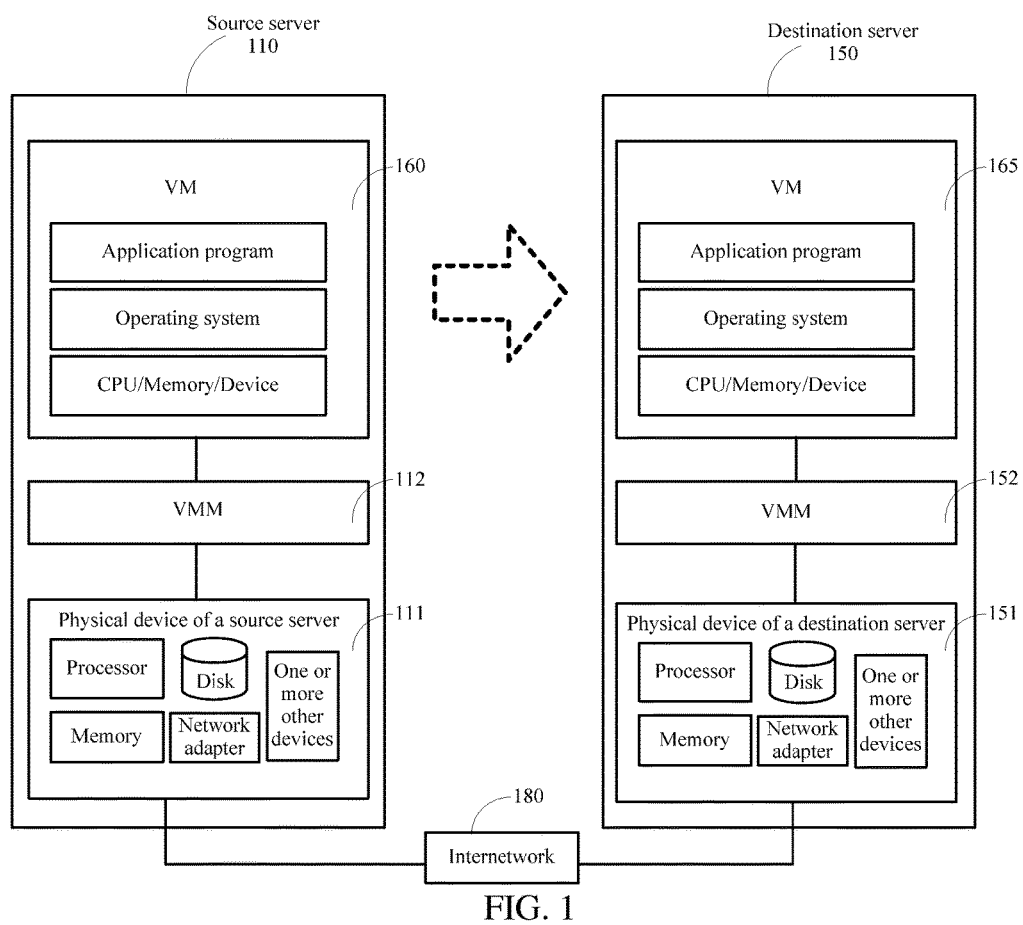
FIG. 1 is a schematic diagram of a migration architecture of virtual machine live migration in the prior art.

FIG. 1 is a schematic diagram of a migration architecture of virtual machine live migration in the prior art. The migration architecture includes a source server 110 before virtual machine migration and a destination server 150 after virtual machine migration. The source server 110 includes a physical device 111 of the source server, a VMM 112 of the source server, and a virtual machine 160 before live migration. The destination server 150 includes a physical device 151 of the destination server, a VMM 152 of the destination server, and a virtual machine 165 after live migration.

The physical device 111 of the source server and the physical device 151 of the destination server connect to each other using an internetwork 180. Like a conventional server, Information Technology (IT) infrastructures of the source server 110 and the destination server 150 include various physical devices, such as a processor, a memory, a network adapter, a disk, and one or more other devices.

A VMM is configured to create and manage one or more virtual machines on a physical device of a server, implementing centralized management for physical and virtual IT infrastructures.

A virtual machine is capable of simulating complete hardware system functions, is capable of operating an operating system, an application program, and is capable of accessing network resources using a virtual network device allocated by a VMM and using a network adapter of a physical device of a server. In the prior art, a virtual network device causes service interruption of data packet receiving and/or data packet sending in virtual machine migration, which cannot ensure continuity of network communication. In addition, due to relatively poor performance of the virtual network device, the VMM must directly participate in each Input/Output (I/O). This not only reduces a data transmission speed, but also increases load of a processor of a server due to more frequent VMM activities; therefore, more physical resources of the server are occupied, which is not beneficial to server performance improving.

For a problem existing in the foregoing migration architecture, an embodiment of the present invention provides a system for virtual machine live migration, which is capable of ensuring network continuity during a migration process, so that a data packet receiving and sending service is not interrupted.

Figure 2:
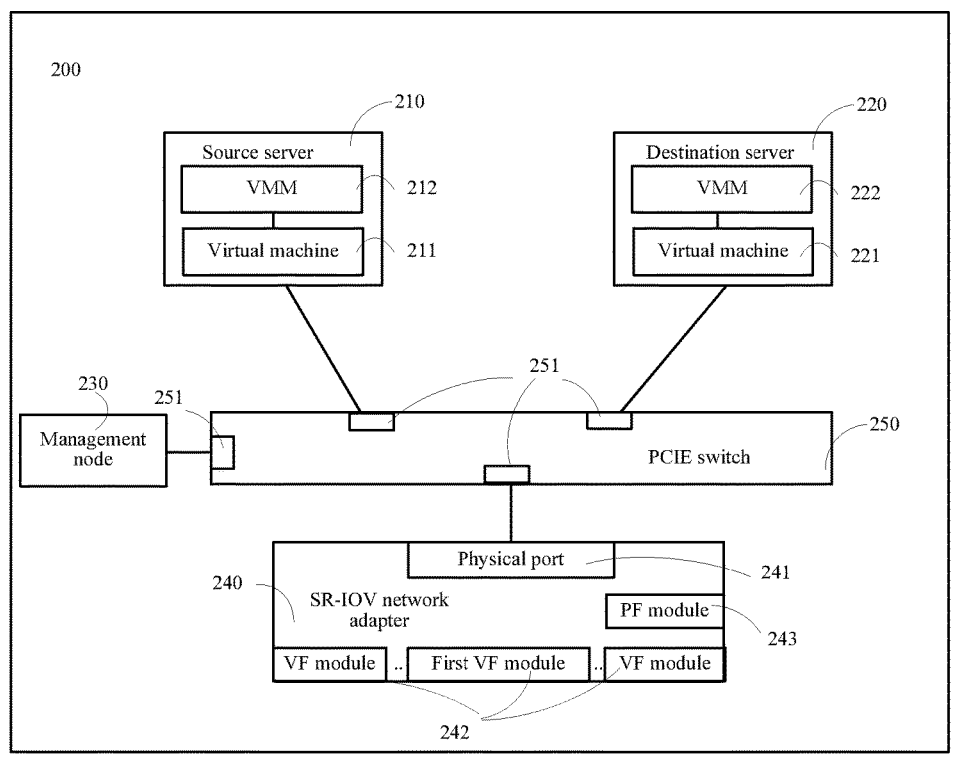
FIG. 2 is a schematic diagram of a system for virtual machine live migration according to an embodiment of the present invention.

FIG. 2 is a schematic block diagram of a system 200 for virtual machine live migration according to an embodiment of the present invention.

The system 200 includes multiple physical nodes, such as a source server 210, a destination server 220, a management node 230, an SR-IOV network adapter 240, and a PCIe switch 250. The source server 210, the destination server 220, the management node 230, and the SR-IOV network adapter 240 separately connect to different physical ports 251 of the PCIe switch 250 to perform communication.

The source server 210 includes a VMM 212 and a virtual machine 211 before live migration, where the virtual machine 211 is a source end of virtual machine live migration.

The destination server 220 includes a VMM 222 and a virtual machine 221 after live migration, where the virtual machine 221 is a destination end of the virtual machine live migration.

The PCIe switch 250, includes multiple Peer to Peer (P2P) physical ports 251 that provide a PCIe bus and are configured to connect to different devices.

The PCIe bus uses a P2P connection manner. Both ends of one PCIe link can separately connect to only one device, and these two devices are a data sending end and a data receiving end. A physical layer of the PCIe bus provides a transfer medium for data communication between devices on both ends of the PCIe link and provides a reliable physical environment for data transfer. The PCIe switch extends the PCIe link, is capable of connecting to multiple physical devices, and is capable of supporting SR-IOV device sharing. That the PCIe switch supports SR-IOV device sharing refers to that an SR-IOV device is shared by different devices using the PCIe switch. The SR-IOV device refers to a device supporting an SR-IOV function, such as a common SR-IOV network adapter.

The SR-IOV network adapter 240 includes one physical input/output port 241, where the physical port 241 is configured to connect to one physical port of the PCIe switch to perform communication.

The SR-IOV network adapter 240 further includes multiple VF modules 242 and one Physical Function (PF) module 243, where the physical port 241 has a one-to-many correspondence with the multiple VF modules 242.

An SR-IOV network adapter includes two types of function modules: a PF module, which supports a PCIe function of an extended SR-IOV function and is adapted to configure and manage an SR-IOV functional characteristic; and a VF module, which implements a simplified PCIe function, and includes required resources for data migration and a simplified configuration resource set. The SR-IOV network adapter may be configured as a form of multiple VF modules and presented in a Peripheral Component Interconnect (PCI) configuration space, and each VF module has its own PCI configuration space. Each VF module is capable of supporting a unique and separate data lane for a related I/O function at a PCIe layer. When an SR-IOV function is used on a network device, bandwidth of a port (function) can be divided into smaller blocks and then the blocks are allocated to a specified virtual machine through a standard interface. This type of resource sharing improves an overall utilization ratio of any specified resources on a PCIe switch supporting SR-IOV device sharing, thereby reducing costs of a virtual system. That is, one of the multiple VF modules included in the SR-IOV network adapter may be allocated by a VMM using a simulated configuration space to the virtual machine. In this way, for multiple virtual machines, one SR-IOV network adapter has an I/O sharing feature of being presented as multiple independent physical network adapters. With the foregoing straight-through technology, the virtual machine may be enabled to directly operate hardware, where the hardware herein is the SR-IOV network adapter. Therefore, performance in aspects such as bandwidth and delay is close to performance of a physical machine directly using a device. However, in a situation in which a virtual network device is used, a data transmission speed is reduced because the VMM must directly participate in each I/O, and load of a processor of a server increases and server performance is affected due to more frequent VMM activities. Therefore, the SR-IOV network adapter has high performance.

The management node 230 configures a connection relationship between the VF module of the SR-IOV network adapter 240 and the source server 210 using the PCIe switch 250, that is, a connection relationship between the VF module and the source server using one physical port of the PCIe switch. For example, it is configured that a first VF module 242 connects to a physical port 251 of the PCIe switch using the physical port 241 of the SR-IOV network adapter and connects to the source server 210 using the PCIe switch; the management node 230 configures a connection relationship between the VF module of the SR-IOV network adapter 240 and the destination server 220, and switches the connection relationship between the VF module and the source server and that between the VF module and the destination server to manage the virtual machine live migration. The management node is a physical node that manages the PCIe switch, for example, it may be a host.

As an implementation process of virtual machine live migration, optionally, a management node initiates a migration request to a virtual machine monitor of a source server; and after configuring, using a PCIe switch, a VF module used by a virtual machine before live migration for a destination server, that is, configuring a connection relationship between the VF module and the source server as a connection relationship between the VF module and the destination server, notifies a virtual machine monitor of the destination server; then, after suspending the virtual machine before live migration according to the migration request, the virtual machine monitor of the source server acquires data of the virtual machine before live migration and configuration information of the VF module and sends them to the virtual machine monitor of the destination server; the virtual machine monitor of the destination server receives a notification from the management node, configures the VF module for a virtual machine after live migration, and configures the VF module of a virtual machine of the destination server according to the data of the virtual machine before live migration and the configuration information of the VF module that are received from the virtual machine monitor of the source server; and the virtual machine after live migration uses the VF module to resume operating on the destination server.

This embodiment of the present invention provides a system for virtual machine live migration, which is capable of implementing virtual machine live migration, and it can be ensured that a data packet receiving service is not uninterrupted because a virtual machine before migration and a virtual machine after migration use a same VF module on a same physical SR-IOV network adapter, thereby ensuring continuity of a network service.

Optionally, that the management node configures the connection relationship between the VF module used by the virtual machine before live migration and the source server as the connection relationship between the VF module and the destination server includes configuring a mapping between one physical port of the PCIe switch and an address of hardware of the source server as a mapping between the physical port of the PCIe switch and an address of hardware of the destination server, where the physical port is used by the VF module.

Optionally, that the virtual machine monitor of the destination server configures the VF module for the virtual machine of the destination server includes changing address mapping information of hardware of an IOMMU of the destination server, so that the VF module accesses the virtual machine after live migration according to the address mapping information.

Optionally, before the management node configures the connection relationship between the VF module of the SR-IOV network adapter used by the virtual machine before live migration and the source server as the connection relationship between the VF module and the destination server, if a to-be-sent data packet still exists on the virtual machine before live migration, the virtual machine monitor of the source server is further configured to send the to-be-sent data packet to the virtual machine monitor of the destination server; and after resuming operating on the destination server, the virtual machine after live migration sends, using the VF module, the to-be-sent data packet that is received by the virtual machine monitor of the destination server from the source server.

Optionally, the VF module is further configured to, after the management node configures the connection relationship between the VF module and the source server as the connection relationship between the VF module and the destination server, if a to-be-received data packet still exists on the virtual machine before live migration, perform Direct Memory Access (DMA), send the to-be-received data packet to the virtual machine monitor of the destination server, and initiate an interruption request to the virtual machine after live migration, so that the virtual machine monitor of the destination server receives and records the interruption request; after the virtual machine after live migration resumes operating on the destination server, the virtual machine monitor of the destination server is further configured to send the recorded interruption request to the virtual machine after live migration; and the virtual machine after live migration is further configured to process the to-be-received data packet.

Figure 3:
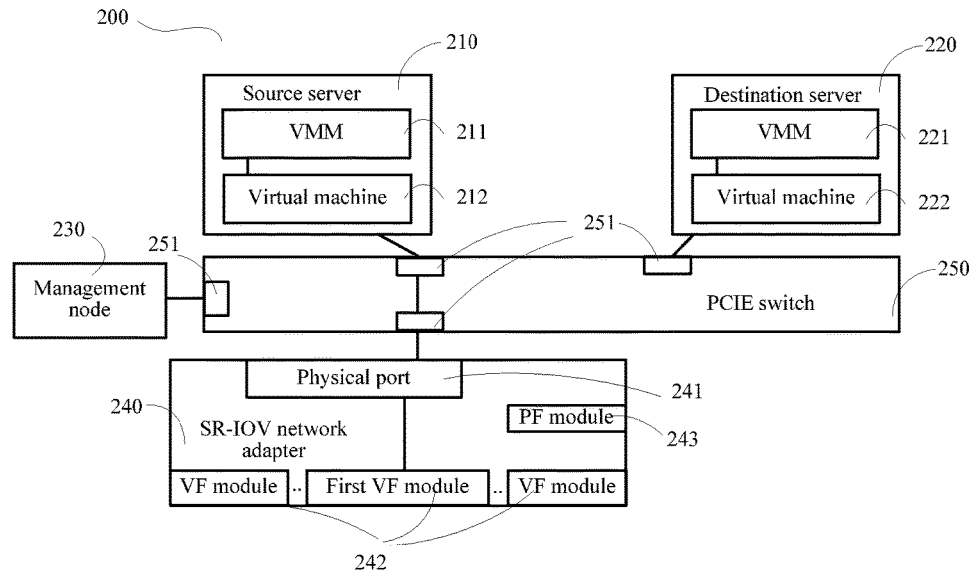
FIG. 3 is a schematic architecture of a system before virtual machine live migration according to an embodiment of the present invention.

FIG. 3 is a schematic architecture of a system before virtual machine live migration according to an embodiment of the present invention. As shown in FIG. 3, before virtual machine live migration, a management node 230 establishes a connection relationship between a source server 210 and an SR-IOV network adapter 240 by configuring a PCIe switch 250. In this case, a VMM 211 of the source server 210 configures one of multiple VF modules 242 of the SR-IOV network adapter 240, for example, a first VF module 242 shown in the figure, for a virtual machine 212 before live migration. That is, the first VF module 242 connects to a physical port 251 of the PCIe switch using a physical port 241 of the SR-IOV network adapter and further implements a connection with the source server using the PCIe switch. The virtual machine 212 implements internetwork communication, such as receiving and sending a data packet, with one or more other devices using the first VF module 242. In addition, a destination server 220 connects to a physical port 251 of the PCIe switch 250. There may be multiple SR-IOV network adapters 240 that connect to the PCIe switch 250. By configuring the PCIe switch 250, the management node 230 establishes a connection relationship between the destination server 220 and one VF module 242 in the SR-IOV network adapter 240. If a virtual machine 222 of the destination server 220 has been established, a VMM 221 may select one VF module 242 from the SR-IOV network adapter 240 that has established the connection relationship with the destination server 220, and configure the selected VF module 242 in the SR-IOV network adapter for the virtual machine 222, where the configured VF module is another VF module except the first VF module. A possible situation includes that both the destination server 220 and the source server 210 connect to a same SR-IOV network adapter, but VF modules configured for the virtual machine 212 and the virtual machine 222 are different. Optionally, a virtual network adapter may further be configured for the virtual machine 222 in a manner of the prior art. In this way, the virtual machine 222 may perform internetwork communication with one or more other devices using the configured VF module or virtual network adapter. Optionally, the VMM 221 temporarily does not perform configuration work of any network device for the virtual machine 222. In this embodiment of the present invention, a connection relationship between the virtual machine 222 of the destination server and the VF module is not shown in FIG. 3, to highlight a connection relationship change in this embodiment of the present invention.

Figure 4:
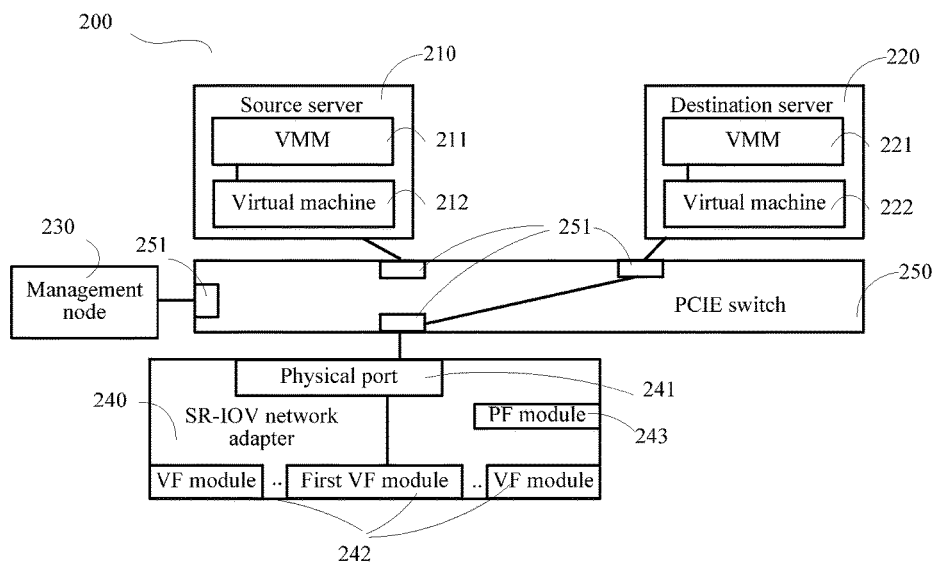
FIG. 4 is a schematic architecture of a system after virtual machine live migration according to an embodiment of the present invention.

FIG. 4 is a schematic architecture of a system after virtual machine live migration according to an embodiment of the present invention. As shown in FIG. 4, after virtual machine live migration, a first VF module 242 originally configured for a virtual machine 212 before live migration is configured by a VMM 221 of a destination server 220 for a virtual machine 222 after live migration. In addition, by configuring a PCIe switch 250, a management node 230 establishes a connection relationship between the destination server 220 and an SR-IOV network adapter 240 originally used by a source server 210. That is, the first VF module 242 connects to a physical port 251 of the PCIe switch using a physical port 241 of the SR-IOV network adapter and further implements a connection with the destination server using the PCIE switch. In this case, a configuration relationship between the virtual machine 212 before live migration and the first VF module does not exist. For example, the virtual machine 212 is suspended or the virtual machine 212 is deleted.

According to the system for virtual machine live migration provided in this embodiment of the present invention, live migration of an SR-IOV network adapter of a virtual machine is implemented by switching the connection relationships in FIG. 3 and FIG. 4, and in particular, it can be ensured that a data packet receiving service is not uninterrupted using a same VF module of a same SR-IOV network adapter before and after migration, thereby ensuring continuity of a network service. In addition, because the virtual machine uses the VF module to perform network communication directly using the SR-IOV network adapter, VMM participation is reduced, and a utilization ratio of resources of a source server or a destination server is improved, thereby improving performance of the source server or the destination server and reducing costs of a virtual system. Further, compared with data migration performed by means of external network communication, data migration performed by the source server and the destination server using a PCIe switch is efficient and stable.

Figure 5:
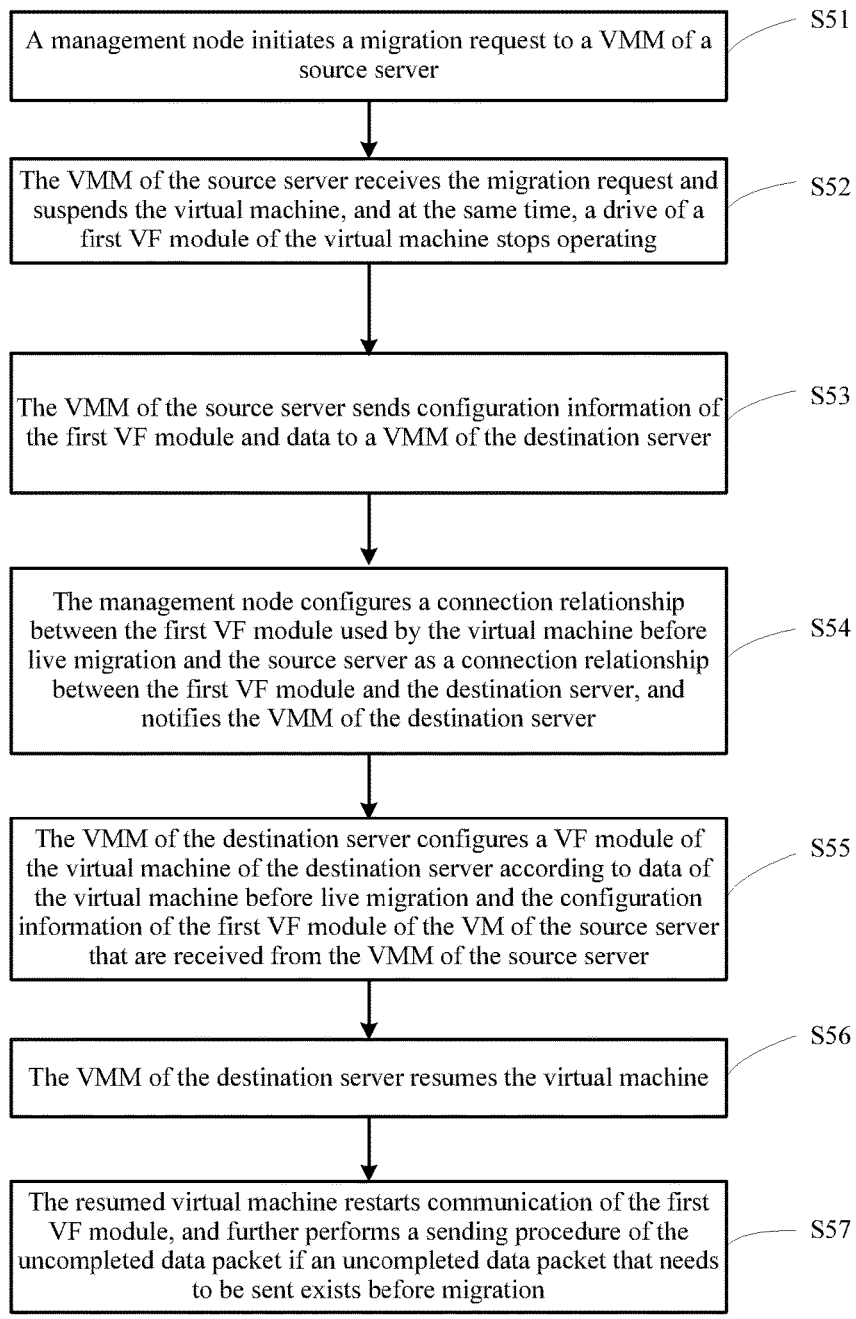
FIG. 5 is a schematic flowchart of a processing method for data packet sending during a virtual machine live migration process according to an embodiment of the present invention.

FIG. 5 is a flowchart of a processing method 50 for data packet sending during a virtual machine live migration process according to an embodiment 50 of the present invention.

S51. A management node initiates a migration request to a VMM of a source server.

In this case, as in the prior art, a communication connection between the source server and a destination server exists. After the source server receives the migration request, the source server and the destination server establish a migration channel, that is, the source server sends a migration request to the destination server; and after receiving the migration request, the destination server establishes a virtual machine on the destination server, where the virtual machine has same configuration as a virtual machine on the source server.

Currently, the management node has established a connection relationship between an SR-IOV network adapter and the source server by configuring a mapping between a port of a PCIe switch and an address of hardware of the source server, as shown in FIG. 3. In addition, a virtual machine before live migration performs network communication with one or more other devices using a first VF module of the SR-IOV network adapter.

S52. The VMM of the source server receives the migration request and suspends the virtual machine, and at the same time, a drive of a first VF module of the virtual machine stops operating.

The virtual machine herein is a virtual machine before virtual machine live migration, such as the virtual machine 212 in FIG. 3.

S53. The VMM of the source server sends configuration information of the first VF module and data to a VMM of the destination server.

This process is the same as that in the prior art. The data includes virtual memory data, disk data, context of a Central Processing Unit (CPU) of the virtual machine, and so on. If at this time an uncompleted data packet that needs to be sent still exists on the virtual machine before migration, the data further includes the to-be-sent data packet. Optionally, this step may be implemented using an external internetwork of the source server and the destination server. When data is exchanged using the PCIe switch in this embodiment of the present invention, this is more efficient and reliable than using the external internetwork.

S54. The management node configures a connection relationship between the first VF module used by the virtual machine before live migration and the source server as a connection relationship between the first VF module and the destination server, that is, the first VF module is configured for the destination server, and the VMM of the destination server is notified.

As shown in FIG. 4, the management node establishes a connection relationship between the SR-IOV network adapter and the destination server by configuring a mapping between one physical port of the PCIe switch and an address of hardware of the source server as a mapping between the physical port of the PCIe switch and an address of hardware of the destination server, where the physical port is used by the first VF module.

S55. The VMM of the destination server configures a VF module of the virtual machine of the destination server according to data of the virtual machine before live migration and configuration information of the first VF module of the VM of the source server that are received from the VMM of the source server.

When receiving a notification from the management node, the VMM of the destination server configures the first VF module as a VF module of a virtual machine after live migration according to the data of the virtual machine before live migration and the configuration information of the first VF module that are acquired from the VMM of the source server. Configuring the VF module of the destination server by the VMM of the destination server includes changing address mapping information of hardware of an IOMMU of the destination server in a memory, so that the VF module accesses the virtual machine after live migration according to the address mapping information. Then, the first VF module configured by the VMM of the destination server becomes a virtual network device of the virtual machine after live migration.

The IOMMU is a component in a hardware-assisted I/O virtualization technology and is configured to maintain an address mapping between a memory of the virtual machine and a physical memory. When accessing a memory address of the virtual machine, an external device, such as the VF module of the SR-IOV network adapter, may access, by means of IOMMU conversion, information stored in a physical memory that maps the memory address of the virtual machine. The hardware-assisted I/O virtualization technology, for example, includes Virtual Technology of Directed I/O (VT-d) or Advanced Micro Devices-Virtual I/O (AMD-Vi).

S56. The VMM of the destination server resumes the virtual machine.

S57. The resumed virtual machine restarts communication of the first VF module, and further performs a sending procedure of the uncompleted data packet if an uncompleted data packet that needs to be sent exists before migration.

Then, the virtual machine after live migration can perform network communication with one or more other devices using the first VF module of the SR-IOV network adapter. The virtual machine completes migration from the source server to the destination server.

Because during the foregoing process, data of a sent data packet, drive status information of the VF module, and configuration information of the VF module are unchanged, and only address mapping information of a configuration space of the first VF module in the PCIe switch and the address mapping information of the hardware of the IOMMU are changed, the address mapping information of the hardware of the IOMMU is the address mapping information of the memory of the virtual machine and the physical memory. A virtual machine at an upper layer does not perceive this and does not need to make any change, and therefore there is no impact on a data packet sending procedure. Compared with a method in which a core of a virtual machine needs to be changed in one or more other virtual machine live migration technologies, the process of this live migration is transparent to upper layer software and easy to implement, and ensures that a data packet sending service is not uninterrupted, thereby ensuring continuity of a network service.

Figure 6:
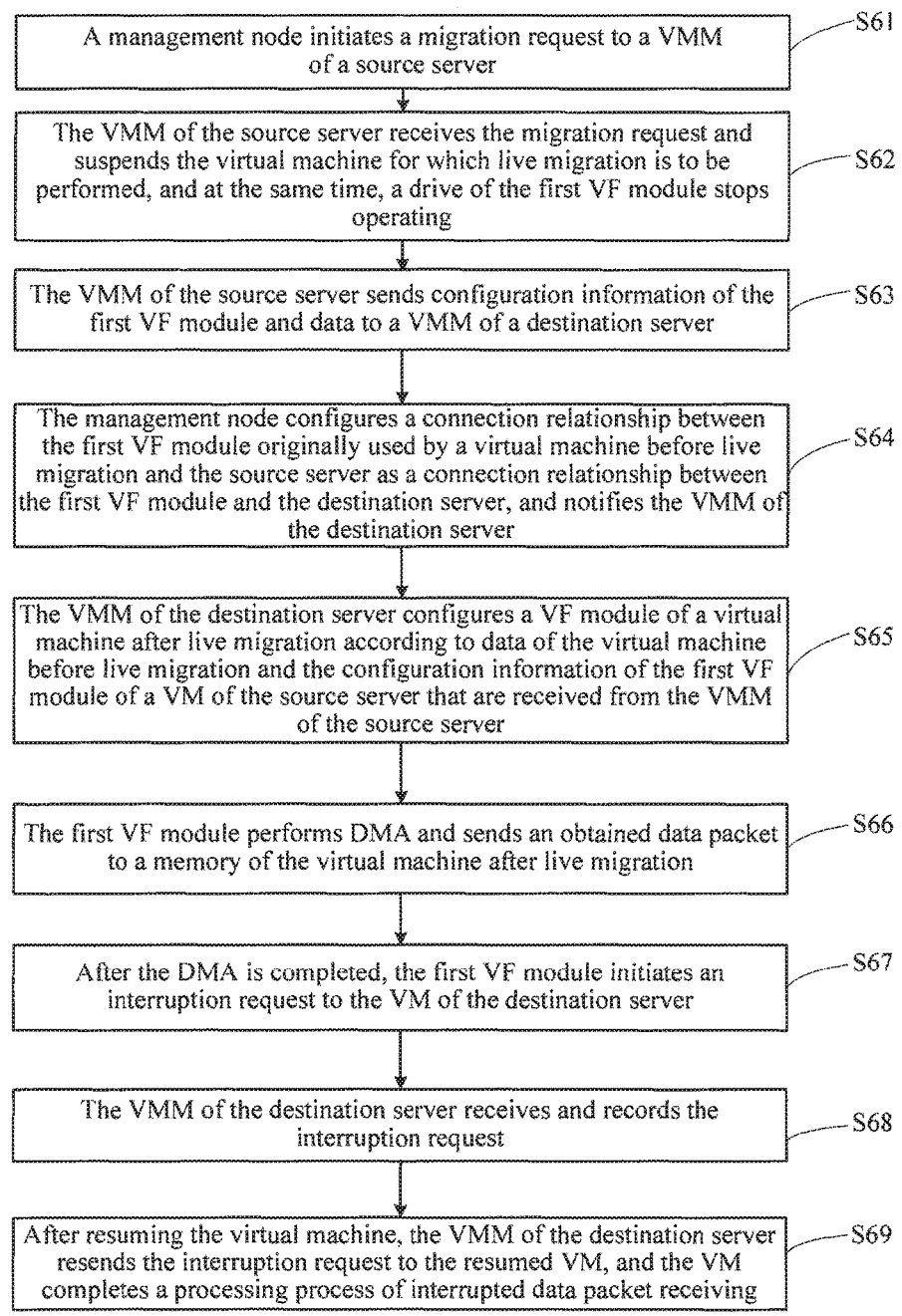
FIG. 6 is a schematic flowchart of a processing method for data packet receiving during a virtual machine live migration process according to an embodiment of the present invention.

FIG. 6 is a schematic diagram of a processing method 60 for data packet receiving during a virtual machine live migration process according to an embodiment 60 of the present invention.

S61. A management node initiates a migration request to a VMM of a source server.

Currently, the management node has established a connection relationship between an SR-IOV network adapter and the source server by configuring a mapping between a PCIe port and an address of hardware of the source server, as shown in FIG. 3. In addition, a virtual machine before live migration performs network communication with one or more other devices using a first VF module of the SR-IOV network adapter.

S62. The VMM of the source server receives the migration request and suspends the virtual machine for which live migration is to be performed, and at the same time, a drive of the first VF module stops operating.

S63. The VMM of the source server sends configuration information of the first VF module and data to a VMM of a destination server.

This process is the same as that in the prior art. The data includes virtual memory data, disk data, context of a CPU of the virtual machine, and so on. If at this time an uncompleted data packet that needs to be sent still exists on the virtual machine before migration, the data further includes the to-be-sent data packet. Optionally, this step may be implemented using an external internetwork of the source server and the destination server. When data is exchanged using a PCIe switch in this embodiment of the present invention, this is more efficient and reliable than using the external internetwork.

S64. The management node configures a connection relationship between the first VF module originally used by the virtual machine before live migration and the source server as a connection relationship between the first VF module and the destination server, that is, the first VF module is configured for the destination server, and the VMM of the destination server is notified.

As shown in FIG. 4, the management node establishes a connection relationship between the SR-IOV network adapter and the destination server by configuring a mapping between one physical port of the PCIe switch and an address of hardware of the source server as a mapping between the physical port of the PCIe switch and an address of hardware of the destination server, where the physical port is used by the first VF module.

S65. The VMM of the destination server configures a VF module of a virtual machine after live migration according to data of the virtual machine before live migration and configuration information of the first VF module of a VM of the source server that are received from the VMM of the source server.

When receiving a notification from the management node, the VMM of the destination server configures the first VF module as the VF module of the virtual machine after live migration according to the data of the virtual machine before live migration and the configuration information of the first VF module that are acquired from the VMM of the source server. Configuring the VF module of the destination server by the VMM of the destination server includes changing address mapping information of hardware of an IOMMU of the destination server in a memory, so that the VF module accesses the virtual machine after live migration according to the address mapping information. Then, the first VF module configured by the VMM of the destination server becomes a virtual network device of the virtual machine after live migration.

The IOMMU is a component in a hardware-assisted I/O virtualization technology and is configured to maintain an address mapping between a memory of the virtual machine and a physical memory. When accessing a memory address of the virtual machine, an external device, such as the VF module of the SR-IOV network adapter, may access, by means of IOMMU conversion, information stored in a physical memory that maps the memory address of the virtual machine.

S66. During the migration process, if the first VF module still continues to receive a data packet, the first VF module performs DMA and sends an obtained data packet to a memory of the virtual machine after live migration. The first VF module obtains data of the received data packet using a descriptor table register of the SR-IOV network adapter.

It should be noted that when the first VF module performs the DMA, the first VF module of the SR-IOV network adapter is still capable of sending data to a memory of the VM of the destination server during a DMA process, because the management node and the VMM of the destination server have been configured with the mapping between the first VF module of the SR-IOV network adapter and a hardware address in the PCIe switch, and the IOMMU is reconfigured according to virtual memory distribution information of the VMs of the source server and the destination server. The virtual memory distribution information of the VMs of the source server and the destination server is information about mapping from the memory of the virtual machine to the physical memory and may be included in the data sent during virtual machine migration.

S67. After the DMA is completed, the first VF module initiates an interruption request to the VM of the destination server.

S68. Because interruption is mapped to the VMM of the destination server, the interruption is not directly transferred to the VM (in this case, the virtual machine is not resumed yet), and the VMM receives and records the interruption request.

S69. After resuming the virtual machine, the VMM of the destination server resends the interruption request to the resumed VM, and the VM completes a processing process of interrupted data packet receiving.

In addition, a process of processing a data packet not processed during the migration process may further be completed with reference to the embodiment 50 of the present invention.

The system and the method for virtual machine live migration provided in the embodiments of the present invention implement virtual machine live migration and are capable of ensuring that a data packet receiving service is not uninterrupted using a same VF module of a same SR-IOV network adapter before and after migration, thereby ensuring continuity of a network service.

In addition, in the embodiments 50 and 60, because a virtual machine uses a VF module to perform network communication directly using an SR-IOV network adapter, VMM participation is reduced, and a utilization ratio of resources of a source server or a destination server is improved, thereby improving performance of the source server or the destination server and reducing costs of a virtual system. Further, compared with data migration performed by means of external network communication, data migration performed by the source server and the destination server using a PCIe switch is efficient and stable.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A system for virtual machine (VM) live migration comprising:
    a management node;
    a source server;
    a source virtual machine monitor of the source server;
    a destination server;
    a peripheral component interconnect express (PCIe) switch; and
    a single root Input/Output virtualization (SR-IOV) network adapter, wherein the source server, the destination server, the management node, and the SR-IOV network adapter separately couple to a physical port of the PCIe switch to perform communication,
    wherein the SR-IOV network adapter comprises a physical input/output port and a virtual function (VF) module,
    wherein the management node is configured to initiate a migration request to the source virtual machine monitor of the source server,
    wherein the source virtual machine monitor, in response to receiving the migration request, is configured to:
        suspend a source virtual machine of the source server and a drive of a first virtual function (VF) module of the source server stops operating at the same time; and
        send data of the source virtual machine, configuration information of the first VF module, and to-be-sent data packet to a destination virtual machine monitor of the destination server, wherein the to-be-sent data packet comprises an uncompleted data packet that exists on the source virtual machine and needs to be transmitted,
    wherein the management node is further configured to:
        update, using the PCIe switch, a connection relationship between the first VF module used by a source virtual machine before live migration and the source server as a connection relationship between the first VF module and the destination server; and
        notify the destination virtual machine monitor,
    wherein the destination virtual machine monitor of the destination server, in response to the notifying, is further configured to:
        configure the VF module of the virtual machine of the destination server according to the data of the source virtual machine and the configuration information of the first VF module that are received from the virtual machine monitor of the source server;
        resume operation of a destination virtual machine using the VF module of the destination server; and
        perform, by the destination virtual machine, a sending procedure of the to-be-sent data packet that needs to be sent.

2. The system according to claim 1, wherein the connection relationship between the VF module and the source server is a connection relationship between the VF module and the source server using one physical port of the PCIe switch, and wherein the connection relationship between the VF module and the destination server is a connection relationship between the VF module and the destination server using one physical port of the PCIe switch.

3. The system according to claim 1, wherein the management node updating the connection relationship between the VF module and the source server to the connection relationship between the VF module and the destination server comprises updating a mapping between one physical port of the PCIe switch and an address of hardware of the source server to a mapping between the physical port of the PCIe switch and an address of hardware of the destination server, and wherein the physical port is used by the VF module.

4. The system according to claim 1, wherein the source virtual machine monitor of the source server is further configured to send a to-be-sent data packet to the virtual machine monitor of the destination server before the management node updates the connection relationship between the VF module and the source server as the connection relationship between the VF module and the destination server and when the to-be-sent data packet still exists on the source virtual machine, and wherein the destination virtual machine is further configured to send, using the VF module, the to-be-sent data packet that is received by the destination virtual machine monitor of the destination server after operating is resumed on the destination server.

5. The system according to claim 1, wherein the VF module is configured to:
    perform direct memory access (DMA) after the management node updates the connection relationship between the VF module and the source server to the connection relationship between the VF module and the destination server and when a to-be-received data packet still exists on the source virtual machine;

send the to-be-received data packet to the virtual machine monitor of the destination server; and initiate an interruption request to the destination virtual machine, wherein the destination virtual machine monitor of the destination server is configured to receive and record the interruption request, wherein the destination virtual machine monitor of the destination server is further configured to send the recorded interruption request to the destination virtual machine after the destination virtual machine resumes operating on the destination server, and wherein the destination virtual machine is further configured to process the to-be-received data packet that is received by the destination virtual machine monitor of the destination server.

6. In a system having a source server, a destination server, a management node, a peripheral component interconnect express (PCIe) switch, and a single root Input/Output virtualization (SR-IOV) network adapter, wherein the source server, the destination server, the management node, and the SR-IOV network adapter are separately coupled to one of a physical ports of the PCIe switch to perform communication, and wherein the SR-IOV network adapter comprises a physical input/output port and a plurality of VF modules, wherein the system performs a method for virtual machine (VM) live migration, comprising:

initiating, by the management node, a migration request to a source virtual machine monitor of the source server;

suspending, by a source virtual machine in response to receiving the migration request, a source virtual machine of the source server and a drive of a first virtual function (VF) module of the source server stops operating at the same time;

sending, by the source virtual machine, data of the source virtual machine, configuration information of the first VF module, and to-be-sent data packet to a destination virtual machine monitor of the destination server, wherein the to-be-sent data packet comprises an uncompleted data packet that exists on the source virtual machine and needs to be transmitted;

updating, using the PCIe switch, a connection relationship between the first VF module used by the source virtual machine before live migration and the source server as a connection relationship between the first VF module and the destination server;

notifying the destination virtual machine monitor;

in response to the notifying, the destination virtual machine monitor performs:

configuring a VF module of the virtual machine of the destination server according to the data of the source virtual machine and the configuration information of the first VF module that are received from the source virtual machine monitor of the source server;

resuming operation of a destination virtual machine using the VF module of the destination server; and performing, by the destination virtual machine, a sending procedure of the to-be-sent data packet that needs to be sent.

7. The method according to claim 6, wherein the connection relationship between the VF module and the source server is a connection relationship between the VF module and the source server using one physical port of the PCIe switch, and wherein the connection relationship between the VF module and the destination server is a connection relationship between the VF module and the destination server using one physical port of the PCIe switch.

8. The method according to claim 6, wherein the management node updating the connection relationship between the VF module and the source server to the connection relationship between the VF module and the destination server comprises updating, by the management node, a mapping between one physical port of the PCIe switch and an address of hardware of the source server to a mapping between one physical port of the PCIe switch and an address of hardware of the destination server, and wherein the physical port is used by the VF module.

9. The method according to claim 6, further comprising:
sending, by the source virtual machine monitor of the source server, a to-be-sent data packet to the destination virtual machine monitor of the destination server before the management node updates the connection relationship between the VF module and the source server as the connection relationship between the VF module and the destination server, when the to-be-sent data packet still exists on the source virtual machine; and sending, by the destination virtual machine using the VF module, the to-be-sent data packet that is received by the destination virtual machine monitor of the destination server after resuming operating on the destination server.

10. The method according to claim 6, further comprising:
performing, by the VF module, direct memory access (DMA) to send a to-be-received data packet to the destination virtual machine monitor of the destination server after the management node updates the connection relationship between the VF module and the source server to the connection relationship between the VF module and the destination server, when a to-be-received data packet still exists on the source virtual machine;

initiating an interruption request to the destination virtual machine, so that the destination virtual machine monitor of the destination server receives and records the interruption request;

sending, by the destination virtual machine monitor of the destination server, the recorded interruption request to the destination virtual machine after the destination virtual machine resumes operating on the destination server; and processing, by the destination virtual machine, the to-be-received data packet that is received by the destination virtual machine monitor of the destination server.

* * * * *